US012649207B2

(12) United States Patent
Okawara

(10) Patent No.: US 12,649,207 B2
(45) Date of Patent: Jun. 9, 2026

(54) COOLANT SUPPLY SYSTEM

(71) Applicant: DMG MORI CO., LTD., Nara (JP)

(72) Inventor: Yasuhito Okawara, Nara (JP)

(73) Assignee: DMG MORI CO., LTD., Nara (JP)

( * ) Notice: Subject to any disclaimer, the term of this patent is extended or adjusted under 35 U.S.C. 154(b) by 24 days.

(21) Appl. No.: 18/965,559

(22) Filed: Dec. 2, 2024

(65) Prior Publication Data

US 2025/0205843 A1 Jun. 26, 2025

(30) Foreign Application Priority Data

Dec. 21, 2023 (JP) ................................ 2023-215466

(51) Int. Cl.
*B23Q 11/10* (2006.01)
*B23Q 11/00* (2006.01)

(52) U.S. Cl.
CPC ...... *B23Q 11/1015* (2013.01); *B23Q 11/0057* (2013.01); *B23Q 11/1069* (2013.01)

(58) Field of Classification Search
CPC ............ B23Q 11/0057; B23Q 11/1069; B23Q 11/1015
See application file for complete search history.

(56) References Cited

U.S. PATENT DOCUMENTS

| | | | | | |
|---|---|---|---|---|---|
| 6,162,355 | A | * | 12/2000 | Mizuno | B01D 21/26 |
| | | | | | 210/512.1 |
| 7,306,730 | B2 | * | 12/2007 | Tashiro | B23Q 11/0057 |
| | | | | | 209/730 |

| | | | | | |
|---|---|---|---|---|---|
| 7,311,744 | B2 | * | 12/2007 | Elliott | B23Q 11/10 |
| | | | | | 55/423 |
| 8,501,017 | B2 | * | 8/2013 | Urban | B23Q 11/1069 |
| | | | | | 210/167.04 |

(Continued)

FOREIGN PATENT DOCUMENTS

| | | | | | |
|---|---|---|---|---|---|
| EP | 1430994 A1 | * | 6/2004 | ......... | B23Q 11/0057 |
| GB | 2594919 A | * | 11/2021 | ........... | B01D 39/083 |

(Continued)

OTHER PUBLICATIONS

WO-03070425 Translation (Year: 2003).*
WO-2023275992 Translation (Year: 2023).*
EP 1430994 Translation (Year: 2004).*

*Primary Examiner* — Umashankar Venkatesan
(74) *Attorney, Agent, or Firm* — IP Business Solutions, LLC

(57) ABSTRACT

A coolant supply system according to an embodiment includes: a first passage for leading a coolant discharged through a first outlet of a tank body into a spindle unit; and a second passage for leading the coolant discharged through a second outlet of the tank body into a discharging device. The spindle unit holds a tool through which the coolant is to be discharged. The discharging device has a discharge outlet larger than that of the tool. In the tank body, the first outlet is located at a gathering position toward which sludge contained in the coolant is caused to gather by a swirling flow of the coolant. The second outlet is located at a position away from the gathering position. A centrifugal filter is having a function of separating sludge by a centrifugal force is provided on the first passage, but no centrifugal filter is provided on the second passage.

6 Claims, 11 Drawing Sheets

(56) References Cited

U.S. PATENT DOCUMENTS

| | | | | |
|---|---|---|---|---|
| 2014/0102964 A1* | 4/2014 | Ishihara | ............. | B23Q 11/1069 |
| | | | | 210/140 |
| 2014/0291228 A1* | 10/2014 | Ishihara | ............. | B23Q 11/1069 |
| | | | | 210/257.1 |
| 2019/0060917 A1* | 2/2019 | Chang | ................ | B23Q 11/1069 |
| 2024/0269790 A1* | 8/2024 | Yamamoto | ......... | B23Q 11/0046 |
| 2024/0325949 A1* | 10/2024 | Goto | ...................... | B01D 29/11 |
| 2025/0146770 A1* | 5/2025 | Okawara | ............. | B01D 33/073 |
| 2025/0360587 A1* | 11/2025 | Funakoshi | ............. | B23Q 11/10 |

FOREIGN PATENT DOCUMENTS

| | | | | | |
|---|---|---|---|---|---|
| JP | 6887033 | B1 | 5/2021 | | |
| WO | WO-03070425 | A1 * | 8/2003 | ......... | B23Q 11/0057 |
| WO | WO-2023275992 | A1 * | 1/2023 | ............. | B23Q 11/10 |

* cited by examiner

Figure 2:
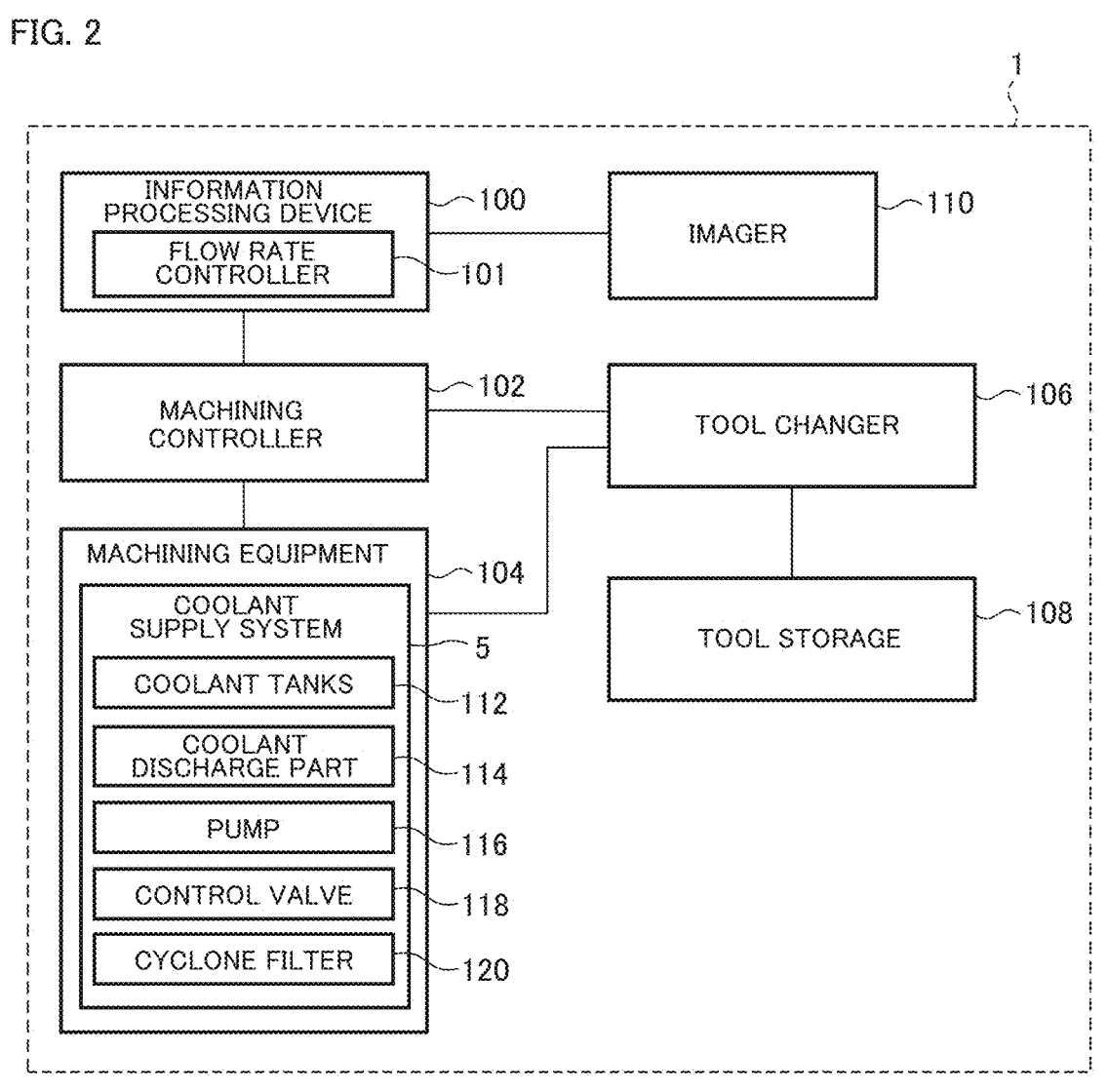

INFORMATION PROCESSING DEVICE ~100

FLOW RATE CONTROLLER ~101

IMAGER ~110

MACHINING CONTROLLER ~102

TOOL CHANGER ~106

MACHINING EQUIPMENT ~104

COOLANT SUPPLY SYSTEM ~5

COOLANT TANKS ~112

COOLANT DISCHARGE PART ~114

PUMP ~116

CONTROL VALVE ~118

CYCLONE FILTER ~120

TOOL STORAGE ~108

8

8

FIG. 8A
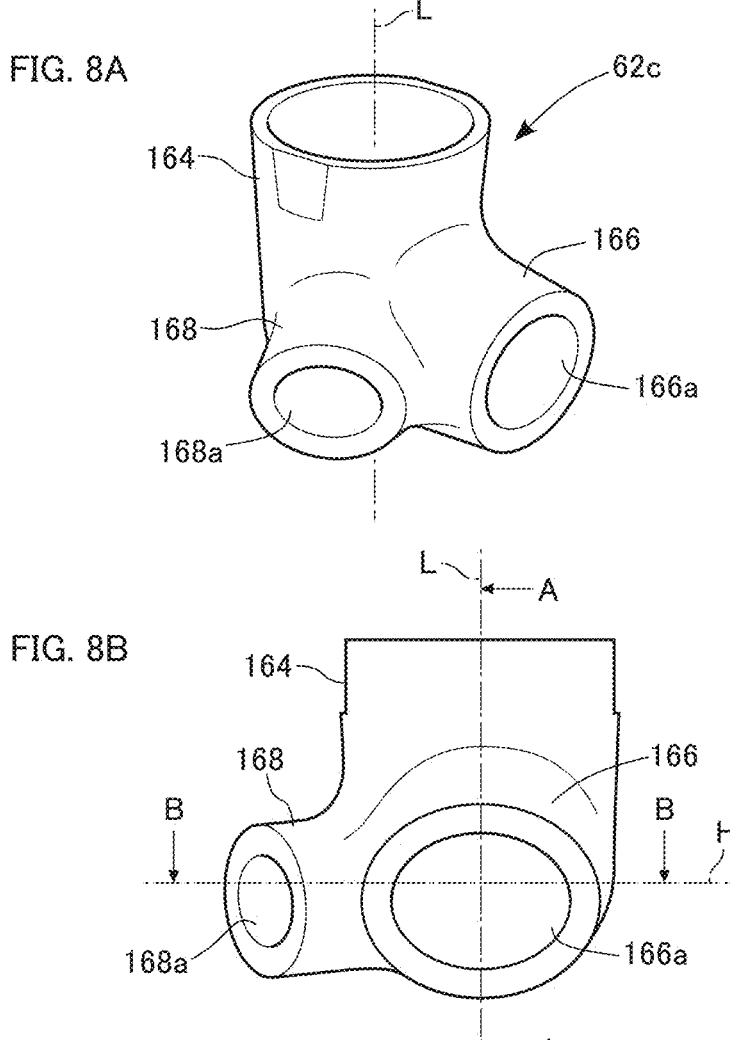
FIG. 8B
FIG. 8C
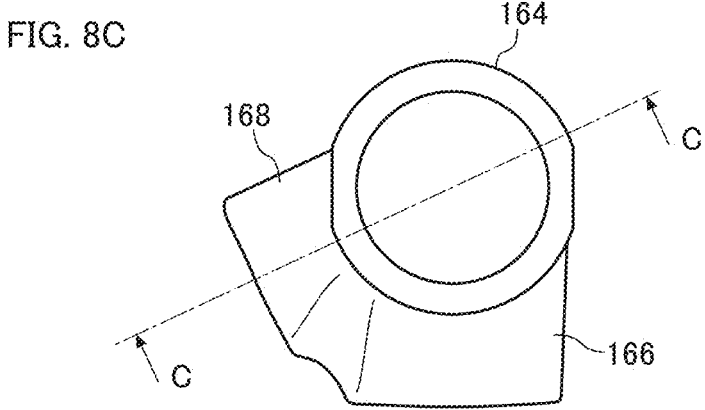

COOLANT SUPPLY SYSTEM

BACKGROUND OF INVENTION

1. Field

The present invention relates to a coolant supply system that supplies a coolant into the inside of a machine tool.

2. Description of Related Art

A machine tool is provided with a coolant supply system for supplying a coolant to be discharged inside the machine tool. The coolant is used as a cutting fluid for removing heat from and lubricating a tool and a workpiece during machining, and also as a cleaning fluid for removing chips scattered in the machine tool (refer to Patent Literature 1). In the machine tool, a coolant circulation path for keeping the coolant clean and circulating the coolant is provided.

A coolant tank for temporarily storing the coolant discharged from the inside of the machine tool is provided on the coolant circulation path. Because the coolant discharged from the inside of the machine tool contains sludge, the coolant needs to be discharged before the sludge solidifies in the tank to remove the sludge outside the tank.

Patent Literature 1: JP 6887033 B2

In recent years, a coolant supply system including a so-called through-spindle coolant device, which discharges a coolant from a leading end of a tool, has also been proposed. A tool and a spindle unit that supports the tool have internal passages h which a coolant circulates and which communicate with a coolant tank. At the leading end of the tool, a discharge outlet through which the coolant is discharged is formed. This device allows the coolant to be discharged from the leading end of the tool during machining, which can improve the machining accuracy, shorten the machining time, increase the tool life, improve the chip removal performance, and the like.

Because, however, the discharge outlet at the leading end of the tool is narrow, even small sludge contained in the coolant can clog the passage. Thus, there have been attempts to provide a high-performance sludge removal device on the coolant circulation path so that all of the coolant returned into the machine tool does not contain sludge. Furthermore, in order to thoroughly remove chips, which impede automation, to the outside of the machine tool, the coolant is also supplied through nozzles installed inside the machine tool in addition to the spindle unit. The coolant therefore tends to be used in large quantities for purposes other than machining. To meet the demands for a larger volume of coolant and also completely remove sludge from all of the coolant, a sludge removal device with a high performance and a high processing capacity is needed, which is disadvantageous in terms of cost.

SUMMARY

An embodiment of the present invention is a coolant supply system that supplies a coolant to be discharged in a machine tool. The coolant supply system includes: a coolant tank that stores the coolant discharged from the inside; a first passage connecting a first outlet of the coolant tank with a first discharge part provided in the inside, the first passage leading the coolant discharged through the first outlet to the first discharge part; and a second passage connecting a second outlet of the coolant tank with a second discharge part provided in the inside, the second passage leading the coolant discharged through the second outlet to the second discharge part. The coolant tank includes: a vertical tank body; and a swirling flow generating structure that causes the coolant discharged from the inside to swirl along an inner face of the tank body. In the tank body, the first outlet is located at a gathering position toward which sludge contained in the coolant is caused to gather by a swirling flow of the coolant, and the second outlet is located at a position away from the gathering position. The first discharge part is a spindle unit that holds a tool having an internal passage through which the coolant is to be discharged, and has a communication passage through which the inner passage and the first passage communicate with each other. The second discharge part is a discharging device having a discharge outlet larger than a discharge outlet of the tool. A centrifugal filter having a function of separating the sludge by a centrifugal force is provided on the first passage, and no centrifugal filter is provided on the second passage.

According to the present invention, in a machine tool in which a coolant can be discharged through a tool, the coolant having passed through the centrifugal filter can be supplied to the spindle unit where a high cleanness is required, and the coolant having a predetermined level of cleanness achieved by the swirling flow generating structure can be supplied for other uses for which such a high cleanness is not required. It is therefore possible to reduce manufacturing cost of a structure relating to sludge separation, increase the flow rate of the coolant to be used, and meet demands for automation and the like.

BRIEF DESCRIPTION OF DRAWINGS

FIG. 2 is a hardware configuration diagram of a machine tool;

FIGS. 8A to 8C are diagrams illustrating structures of discharge pipe portions;

DETAILED DESCRIPTION

An embodiment of the present disclosure will now be described with reference to the drawings.

Figure 1:
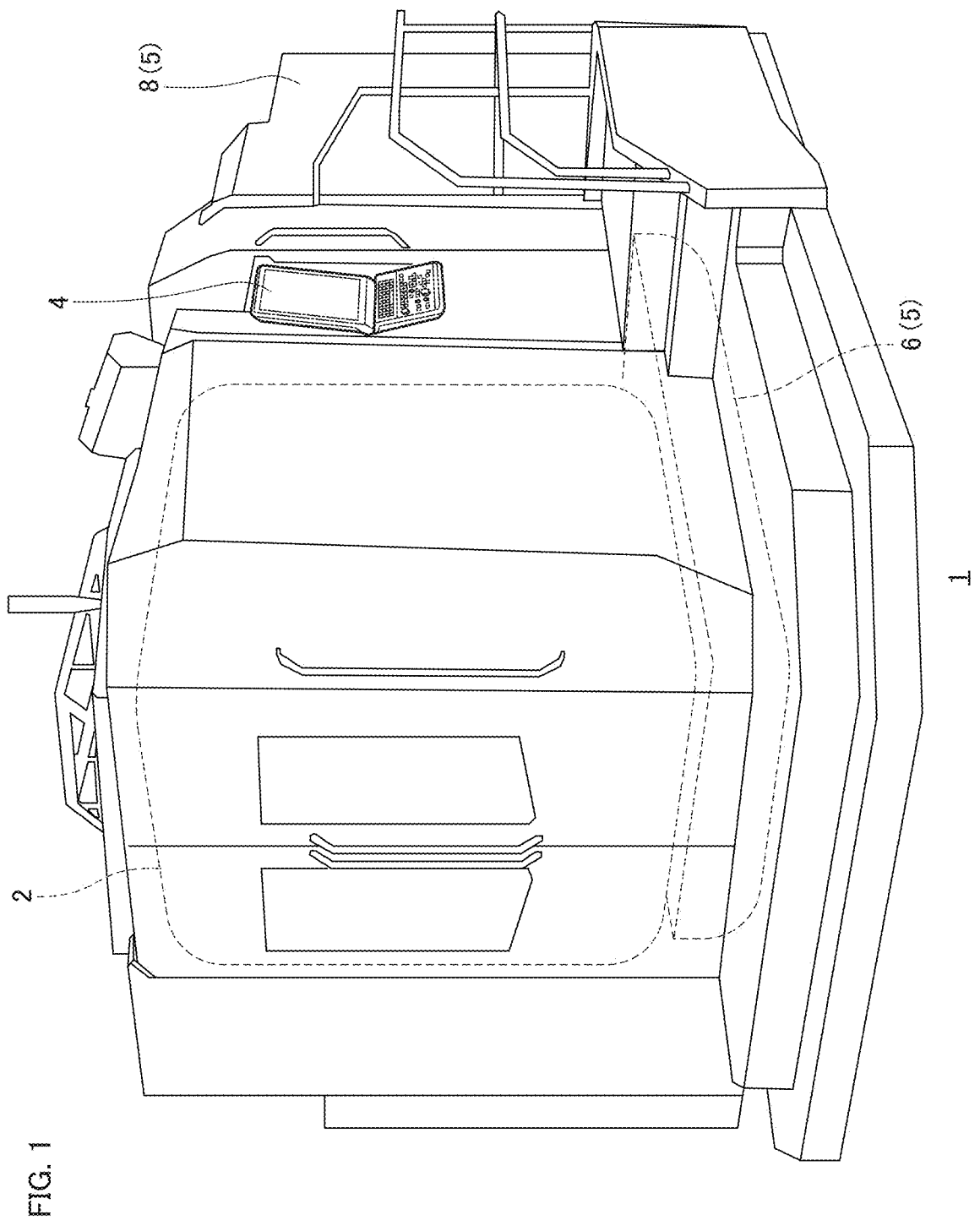
FIG. 1 is a perspective view of an external appearance of a machine tool according to an embodiment.

FIG. 1 is a perspective view of an external appearance of a machine tool according to an embodiment.

The machine tool 1 is configured as a combined machine for machining a workpiece into a desired shape by appropriately changing tools. The machine tool 1 has a machining chamber 2 inside a machine housing. Machining equipment for machining a workpiece is installed in the machining chamber 2. An operation panel 4 for operating the machining equipment is installed on a side face of the machine housing.

The machine tool 1 is provided with a coolant supply system 5 for supplying a coolant into the machining chamber 2. Coolant tanks (primary tank 6, secondary tank 8) for temporarily storing the coolant discharged from the machining chamber 2 are arranged on a coolant circulation path of the coolant supply system 5. The primary tank 6 is located under the machining chamber 2, and the secondary tank 8 is located on the back of the machining chamber 2. In the embodiment, the secondary tank 8 is a vertical tank adopting a structure capable of generating a swirling flow of the coolant therein and reducing stagnation of the coolant to efficiently remove sludge contained in the coolant. Hereinafter, details of the structure will be described.

FIG. 2 is a hardware configuration diagram of a machine tool 1.

The machine tool 1 includes an information processing device 100, a machining controller 102, machining equipment 104, a tool changer 106, a tool storage 108, and an imager 110. The machining controller 102 functions as a numerical controller, and outputs control signals to the machining equipment 104 in accordance with a machining program (NC program). The machining equipment 104 moves a tool spindle (a "spindle unit" to be described later) to machine a workpiece in accordance with instructions from the machining controller 102.

The machining equipment 104 includes a mechanism for driving the spindle, and the coolant supply system 5 that supplies the coolant into the machining chamber 2. The coolant is used as a cutting fluid for removing heat from and lubricating a tool and a workpiece during machining, and also as a cleaning fluid for removing chips scattered in the machining chamber 2. The coolant supply system 5 includes coolant tanks 112, a coolant discharge part 114, a pump 116, a control valve 118, and a cyclone filter 120, which are provided on a coolant circulation path.

The coolant tanks 112 are tanks for storing the coolant, and include the primary tank 6 and the secondary tank 8. The coolant discharge part 114 is a "discharging device" including a nozzle for discharging the coolant into the machining chamber 2 and an actuator for driving the nozzle. The pump 116 is driven to cause the coolant to circulate and be supplied to the coolant discharge part 114. The control valve 118 includes a plurality of on-off valves, which will be described later, to switch between coolant flow paths. The cyclone filter 120 is a centrifugal filter capable of separating sludge from the coolant flowing through the coolant circulation path by a centrifugal force to collect the sludge (details of which will be described later).

The information processing device 100 includes the operation panel 4, and outputs control commands to the machining controller 102 in accordance with operational inputs performed by an operator. The information processing device 100 also controls screens displayed on a monitor of the operation panel 4 in accordance with operational inputs performed by the operator. The tool storage 108 stores tools. The tool changer 106 corresponds to a so-called automatic tool changer (ATC) that takes out a tool from the tool storage 108 and replace a tool on the tool spindle with the taken-out tool in accordance with a replacement instruction from the machining controller 102.

The information processing device 100 includes a flow rate controller 101. The flow rate controller 101 controls the pump 116 and the control valve 118. The flow rate controller 101 thus adjusts the discharge volumes of the coolant in the coolant tanks 112 and also adjusts the discharge volume of the coolant from the coolant discharge part 114.

The imager 110 is a camera including an imaging sensor such as a CCD or a CMOS, for example, and images an imaging area set in the machining chamber 2. For the "imaging area", an area in which chips produced by machining of a workpiece are likely to be present is set in advance. The angle of view of the camera is set so that the distribution and accumulation of chips can be captured in a wide range in the machining chamber 2. The imager 110 outputs taken images to the information processing device 100.

Figure 3A:
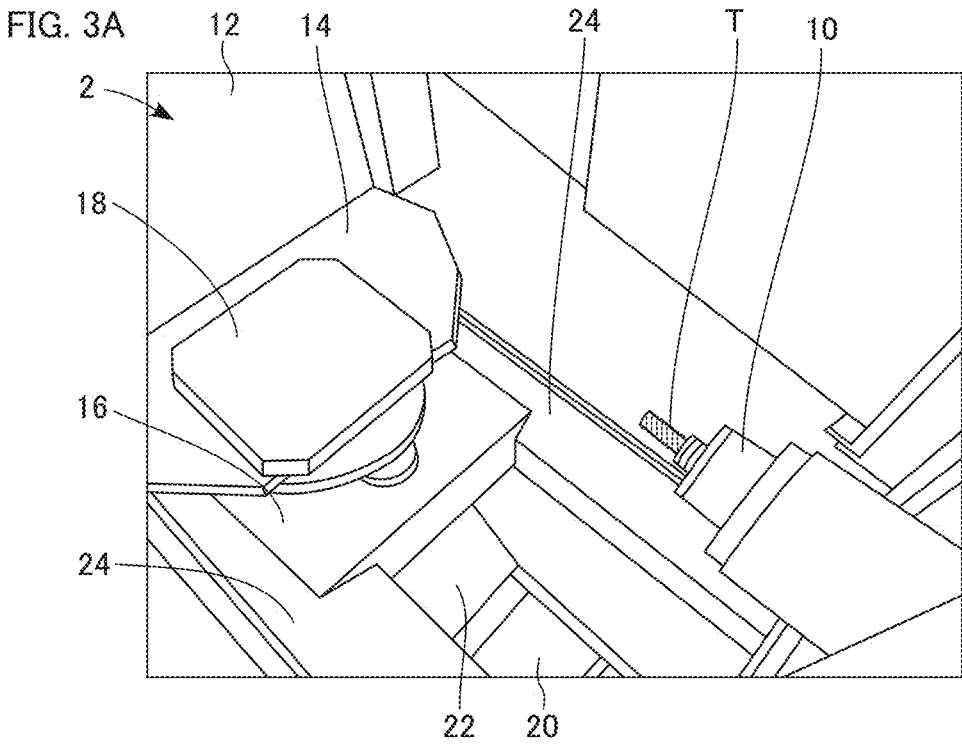
FIGS. 3A and 3B are perspective views of structures inside a machining chamber.
Figure 3B:
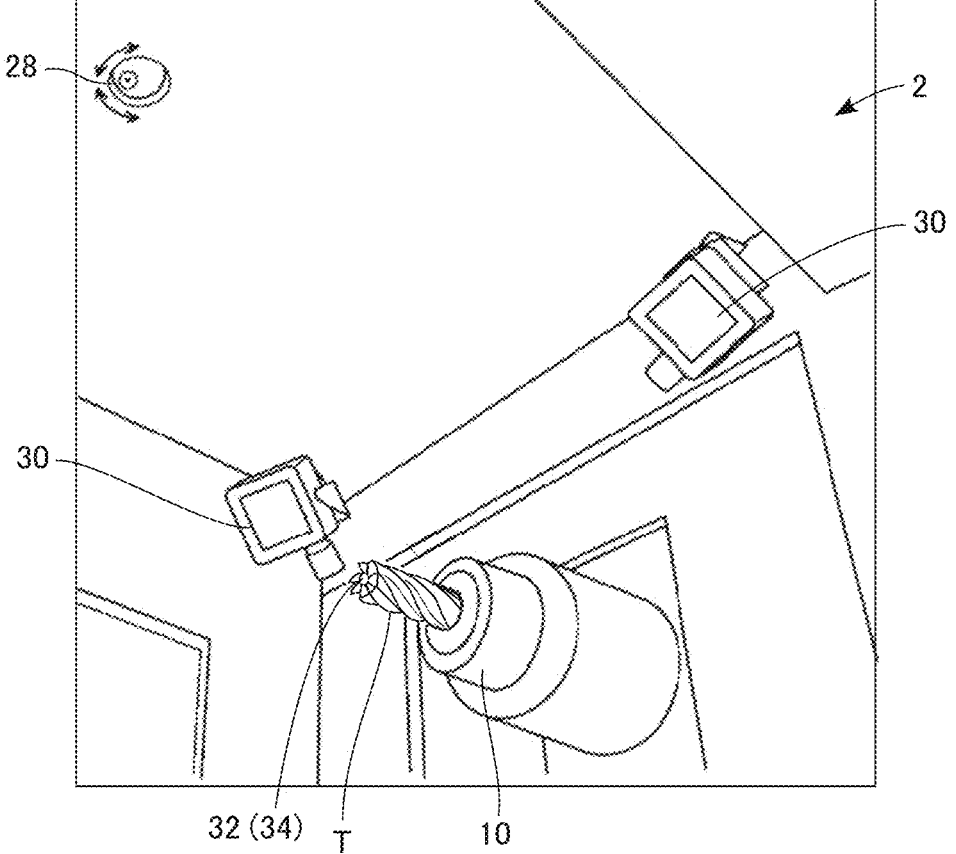

FIGS. 3A and 3B are perspective views of structures inside the machining chamber 2. FIG. 3A illustrates a view from obliquely above, and FIG. 3B illustrates a view from obliquely below.

As illustrated in FIG. 3A, the machining chamber 2 is surrounded by four side faces, and a spindle unit 10 is installed on one of the side faces in a manner in which the spindle unit 10 is movable vertically and horizontally. The spindle unit 10 has a rotation axis along a horizontal direction, and a tool T is coaxially attached to a distal end of the spindle unit 10. A side face opposite the spindle unit 10 in the axial direction has a revolving door 12. A support plate 14 extends horizontally from the revolving door 12. The revolving door 12 is a door that is turnable about a vertical axis.

A table 16 is provided below the support plate 14. A pallet 18 is removably attached to the table 16, and a workpiece is placed on and fixed to the pallet 18. A plurality of pallets 18 onto each of which a workpiece is fixed are prepared, so that a workpiece can be replaced by replacement of a pallet 18, which improves time efficiency.

The table 16 is movable along the axial direction of the spindle unit 10, and rotatable along a horizontal plane. The table 16 is driven to rotate so as to rotate the workpiece on the pallet 18. When the table 16 is linearly driven, the workpiece moves closer to or away from the tool T. Thus, control of the rotation and the movement of the table 16 and the movement of the spindle unit 10 enable machining of a workpiece into a desired shape.

At a position where the table 16 is farthest from the spindle unit 10, the support plate 14 is fitted to the pallet 18. When the revolving door 12 is turned in this state, the support plate 14 separates the pallet 18 from the table 16 and turns with the pallet 18. In this manner, a pallet 18 with a workpiece on which machining is completed can be taken out from the machining chamber 2 and a pallet 18 to which a workpiece to be machined next is fixed can be brought into the machining chamber 2.

A chip conveyor 20 for carrying chips out of the machining chamber 2 is provided below the table 16 and the spindle unit 10. The table 16 moves above the chip conveyor 20. A shooter 22 is provided below the table 16. The shooter 22 guides chips, which are flushed out from above by cleaning, onto the chip conveyor 20.

In the machining chamber 2, bottom faces on respective sides of the table 16 are slope faces 24, which are inclined down toward the shooter 22 so that chips scattered during machining easily flow to the shooter 22. The primary tank 6 is located below the machining chamber 2, and the coolant having used to flush out chips from the inside flows and onto the chip conveyor 20 located in the primary tank 6 and is thus collected. Then, the coolant having passed through a drum filter 44 in the chip conveyor 20 flows into and temporarily accumulates in the primary tank 6 (details of which will be described later).

As illustrated in FIG. nozzles 28 for supplying the coolant are located at predetermined positions on the ceiling and the side faces of the machining chamber 2. The nozzles 28 constitute the coolant discharge part 114, and are connected with the secondary tank 8 via pipes, which are not illustrated (details of which will be described later). The nozzles 28 are three-dimensionally turnable. The coolant discharging direction can be controlled by turning of the nozzles 28. The directions of the nozzles 28 are specified, which enables the coolant to be discharged toward a target in the machining chamber 2. Chips produced during machining of workpieces are flushed out with the coolant and carried out of the machining chamber 2 by the chip conveyor 20.

A plurality of cameras 30 for imaging the inside of the machining chamber 2 from above are also installed in the upper part of the machining chamber 2. The cameras 30 constitute the imager 110, and are configured to image the state of a workpiece being machined with a tool T and to image chips produced during machining (see FIG. 2). The imager 110 outputs a taken image to the information processing device 100.

The components of the information processing device 100 are implemented by hardware including computing units such as central processing units (CPUs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs.

For controlling cleaning of the inside of the machine tool with the coolant, the information processing device 100 sets a target position toward which the coolant is to be discharged on the basis of the taken image obtained from the imager 110. The information processing device 100 then outputs a discharge command to the machining controller 102 to discharge the coolant toward the target position. The discharge command contains information specifying the position toward which the coolant is to be discharged (such as information specifying a discharge path). The machining controller 102 in receipt of the discharge command drives the coolant discharge part 114 and controls discharge of the coolant.

The spindle unit 10 is a so-called through-spindle coolant device that holds the tool T having an internal passage 32 through which the coolant is to be discharged. At the leading end of the tool T, a discharge outlet 34 that is an end of the internal passage 32 and from which the coolant is discharged is formed. The spindle unit 10 has a communication passage 36 (see FIGS. 3A and 3B) through which the internal passage 32 in the tool T and the coolant circulation path communicate with each other. During machining, the coolant is discharged from the leading end of the tool T, which can improve the machining accuracy, shorten the machining time, increase the tool life, improve the chip removal performance, and the like. The spindle unit 10 to which the tool T is attached functions as a "first discharge part".

Figure 4:
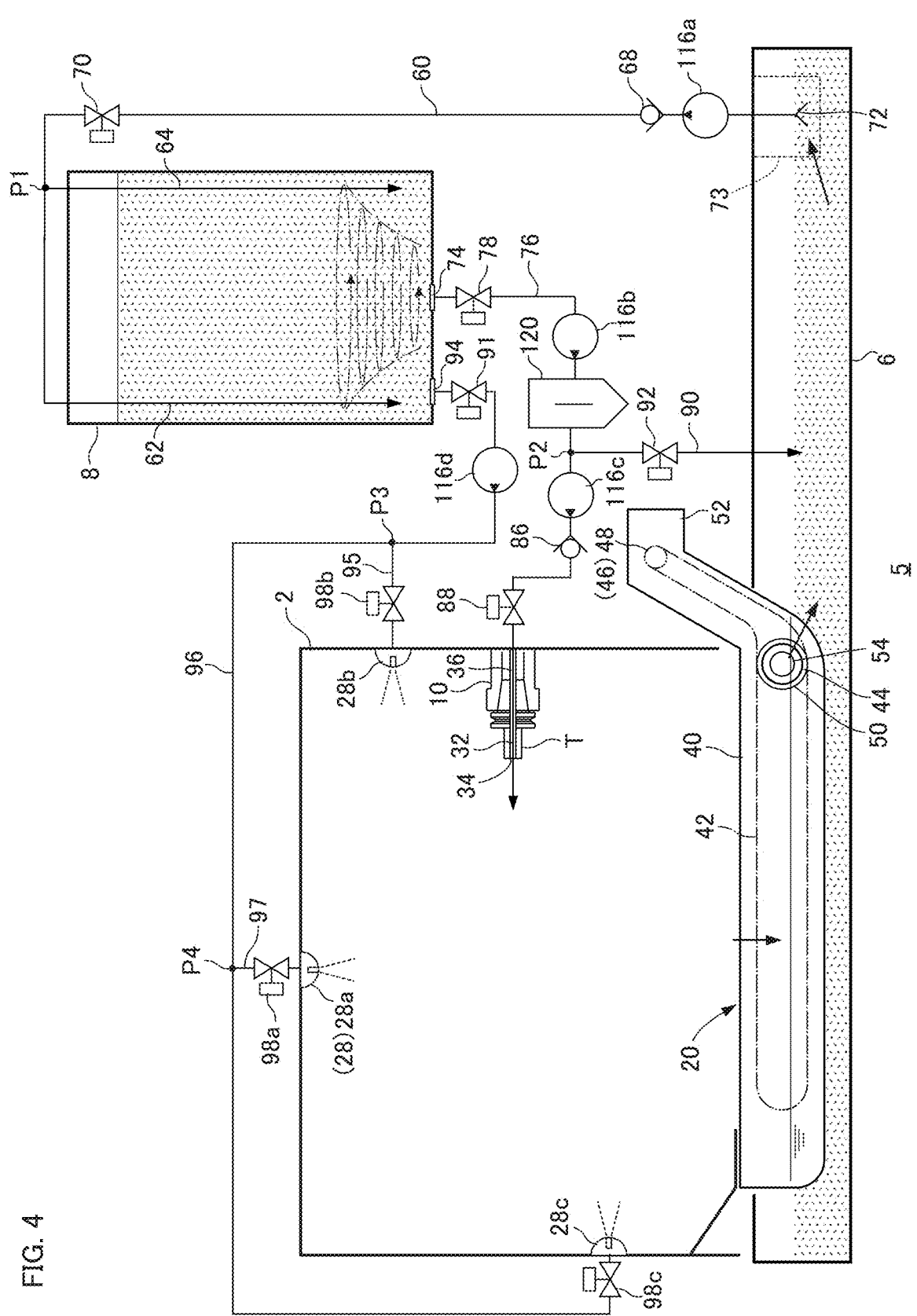
FIG. 4 is a diagram schematically illustrating a configuration of a coolant supply system.

FIG. 4 is a diagram schematically illustrating a configuration of the coolant supply system 5.

The coolant supply system 5 has a coolant circulation path including the machining chamber 2, the primary tank 6, and the secondary tank 8 connected via pipes and the like. In the machining chamber 2, the spindle unit 10 and a plurality of nozzles 28 capable of discharging the coolant. In the embodiment, a nozzle 28*a* is located on the ceiling surface of the machining chamber 2. In addition, a nozzle 28*b* is located on a first side face on which the spindle unit 10 is located, and a nozzle 28*c* is located on a second side face opposite the first side face. These nozzles 28 are nozzles for cleaning the inside of the machine tool and functions as a "second discharge part".

A middle portion of the bottom face of the machining chamber 2 is open toward the chip conveyor 20. The chip conveyor 20 is constituted by a pair of endless chains 42, the drum filter 44, and a drive mechanism 46 contained in a hollow housing 40. The drive mechanism 46 includes a plurality of sprockets over which the endless chains 42 are placed. A sprocket 48, which is one of the sprockets, is driven to rotate by a motor, which is not illustrated, and a sprocket 50 is integrally provided with the drum filter 44. Scrapers, which are not illustrated, are provided at regular intervals along the longitudinal direction of the pair of endless chains 42 between the endless chains 42, so that the rotation of the sprocket 50 rotates the scrapers in the housing 40. The drum filter 44 is a drum-shaped filter having a filtering function and capable of capturing foreign materials contained in the coolant. The rotation of the sprocket 48 drives the endless chains 42 and rotates the drum filter 44.

One end of the housing 40 extends obliquely above, and a chip removal part 52 is formed at the leading end thereof. The endless chains 42 are arranged to reach the chip removal part 52. A chip bucket, which is not illustrated, for collecting chips is installed immediately below the chip removal part 52.

The primary tank 6 is installed to contain the housing 40 from below. The primary tank 6 is a container having an open upper end, having a rectangular shape in plan view, and being sufficiently larger than the housing 40 in plan view. An outlet 54 for draining the coolant to the primary tank 6 is formed on a side face of the housing 40. The outlet 54 communicates with the inside of the drum filter 44.

Chips removed from the machining chamber 2 are conveyed by the endless chains 42 to the chip removal part 52. The chips are discharged by the chip removal part 52 and collected in the chip bucket. In the meantime, the coolant used to flush out chips in the machining chamber 2 is introduced into the housing 40 and led to the inside of the drum filter 44 that is rotating. The coolant is filtered while passing through the surface of the drum filter 44. In this process, relatively large foreign materials such as chips contained in the coolant are caught by the drum filter 44. The filtered coolant is discharged to the primary tank 6 through the outlet 54.

The primary tank 6 is connected with the secondary tank 8 via a pipe 60. The pipe 60 is arranged to pass above the primary tank 6, bifurcate at a branching point P1 into a first pipe 62 and a second pipe 64, which are inserted into and hang in the primary tank 6. The pipe 60 is provided with a pump 116*a*, a check valve 68, and an on-off valve 70 in this order from the upstream side. The on-off valve 70 is an electromagnetic valve driven by a solenoid in the embodiment, but may be a motor-operated valve driven by a motor.

An upstream end of the pipe 60 is a suction inlet 72 for the coolant. The primary tank 6 is provided with a mesh-like filter 73 surrounding the suction inlet 72. The filter 73 prevents or reduces entry of foreign materials from the primary tank 6 into the suction inlet 72. The on-off valve 70 is opened to drive the pump 116*a*, which can pump up the coolant from the primary tank 6 into the secondary tank 8. The check valve 68 prevents backward flow of the coolant in the pipe 60.

An outlet 74 (first outlet) is formed at the middle of a bottom face of the secondary tank 8, and one end of a pipe 76 is connected to the outlet 74. The other end of the pipe 76 communicates with the communication passage 36 in the spindle unit 10. A passage in the pipe 76 functions as a "first passage" through which the coolant discharged through the outlet 74 is led to the spindle unit 10. The pipe 76 is provided with an on-off valve 78, a pump 116b, the cyclone filter 120, a pump 116c, a check valve 86, and an on-off valve 88 in this order from the upstream side.

The cyclone filter 120 is a centrifugal filter capable of separating sludge from the coolant discharged from the secondary tank 8 by a centrifugal force to collect the sludge. The on-off valves 78 and 88 are electromagnetic valves in the embodiment, but may be motor-operated valves. The on-off valves 78 and 88 are opened to drive the pumps 116b and 116c, so that the coolant is supplied to the spindle unit 10. The check valve 86 prevents backward flow of the coolant in the pipe 76.

A branching point P2 is located between the cyclone filter 120 and the pump 116c of the pipe 76, and a pipe 90 branches off at the branching point P2. A distal end of the pipe 90 is open in the primary tank 6. The pipe 90 is provided with an on-off valve 92. The on-off valve 92 is an electromagnetic valve in the embodiment, but may be a motor-operated valve. The on-off valve 92 is opened, so that part of the coolant discharged from the secondary tank 8 into the pipe 76 can be returned to the primary tank 6 via the pipe 90.

An outlet 94 (second outlet) is formed at the periphery of the secondary tank 8, and one end of a pipe 96 is connected with the outlet 94. The other end of the pipe 96 is connected with the nozzle 28c. The pipe 96 is provided with an on-off valve 91 and a pump 116d in this order from the upstream side. At the other end of the pipe 96 (upstream of the nozzle 28c), an on-off valve 98c is provided. Branching points P3 and P4 are located on the pipe 96 on the downstream side of the pump 116d, and pipes 95 and 97 branch off at the branching points P3 and P5, respectively. A distal end of the pipe 97 is connected with the nozzle 28a. The pipe 97 is provided with an on-off valve 98a. A distal end of the pipe 95 is connected with the nozzle 28b. The pipe 95 is provided with an on-off valve 98b. A passage in the pipe 96 functions as a "second passage" through which the coolant discharged through the outlet 94 is led to the nozzles 28.

The on-off valve 91 is opened to drive the pump 116d so as to supply the coolant from the secondary tank 8 to the nozzles 28. The on-off valve 98a is opened so as to discharge the coolant through the nozzle 28a, and the on-off valve 98b is opened so as to discharge the coolant through the nozzle 28b. The on-off valve 98c is opened so as to discharge the coolant through the nozzle 28c. In this process, the orientations of the individual nozzles 28 are set so as to control the positions to which the coolant is discharged in the machining chamber 2.

In the configuration described above, the coolant discharged from the spindle unit 10 and the nozzles 28 is led from the bottom of the machining chamber 2 to the chip conveyor 20, filtered by the drum filter 44, and then temporarily stored in the primary tank 6. The coolant in the primary tank 6 is pumped up by the pump 116a, led to and temporarily stored in the secondary tank 8. In the secondary tank 8, a swirling flow of the coolant is generated (details of which will be described later). The swirling flow causes sludge contained in the coolant to gather toward the middle (around the middle) of the bottom face of the secondary tank 8. Thus, the concentration of sludge in the secondary tank 8 is relatively higher at the middle of the bottom face and relatively lower at the periphery (around the periphery).

The coolant in the secondary tank 8 is discharged to two different paths, which are the pipe 76 connected with the outlet 74 at the middle of the bottom face and the pipe 96 connected with the outlet 94 at the periphery of the bottom face, and supplied into the machining chamber 2. The coolant discharged to the pipe 76 is led to the cyclone filter 120 by the power of the pump 116b, where sludge is centrifugally separated and removed, and then led to the spindle unit 10 by the power of the pump 116c. The coolant is then discharged through the discharge outlet 34 of the tool T. The coolant discharged from the tool T is led to the chip conveyor 20 again from the bottom of the machining chamber 2. In this manner, a coolant circulation path (first circulation path) including the passage through the pipe 76 is formed in the coolant supply system 5.

Although the internal passage 32 in the tool T is narrow, the coolant from which sludge has been removed by the cyclone filter 120 is supplied, and therefore such problems as clogging of the passage with sludge are less likely to occur. In addition, because sludge that is gathered around the middle of the bottom face of the secondary tank 8 is actively led to the cyclone filter 120, the efficiency of sludge collection is improved.

Meanwhile, the coolant discharged to the pipe 96 is led to the respective nozzles 28 by the power of the pump 116d, and discharged into the machining chamber 2. The coolant discharged through the nozzles 28 is then led to the chip conveyor 20 again from the bottom of the machining chamber 2. In this manner, a coolant circulation path (second circulation path) including the passage through the pipe 96 is further formed in the coolant supply system 5. Because the concentration of sludge in the coolant discharged from the pipe 96 is low, the amount of sludge led to the nozzles 28 is small. Furthermore, because the discharge outlets of the nozzles 28 are sufficiently larger than the discharge outlet 34 of the tool T, such problems as clogging of the passage with sludge are less likely to occur.

As described above, according to the embodiment, the cyclone filter 120 (centrifugal filter), which is typically expensive, is provided on the coolant circulation path passing through the spindle unit 10 (through-spindle coolant device), that is, the first circulation path in which the coolant is required to be highly clean. In contrast, no centrifugal filter is provided on the coolant circulation path passing through each nozzle 28, that is, the second circulation path in which the coolant is not required to be so clean as in the through-spindle coolant device. This can reduce the cost for the coolant supply system 5 as a whole.

Next, a detailed structure of the secondary tank 8 (coolant tank) will be described.

Figure 5:
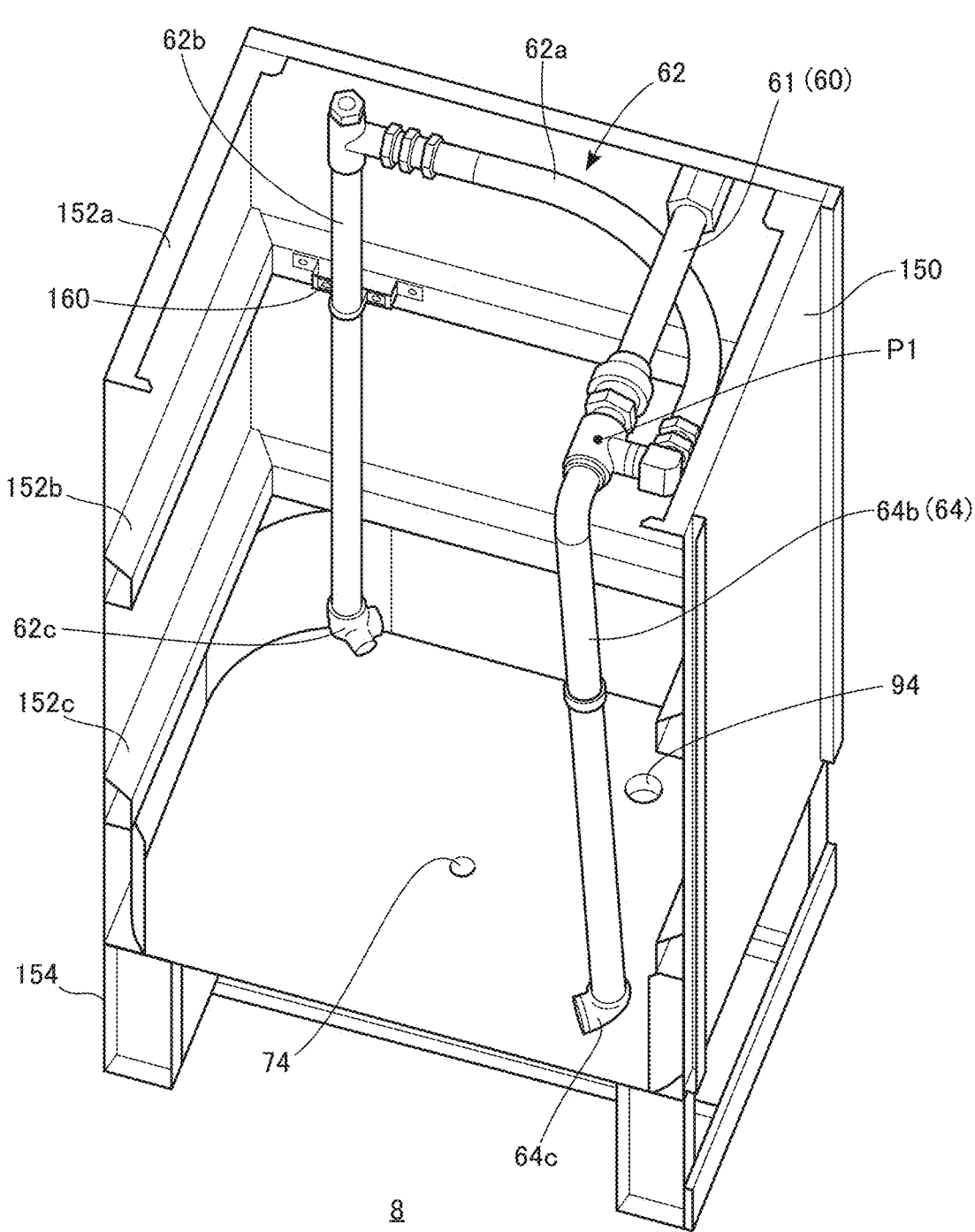
FIG. 5 is a diagram illustrating a structure of a secondary tank.
Figure 6:
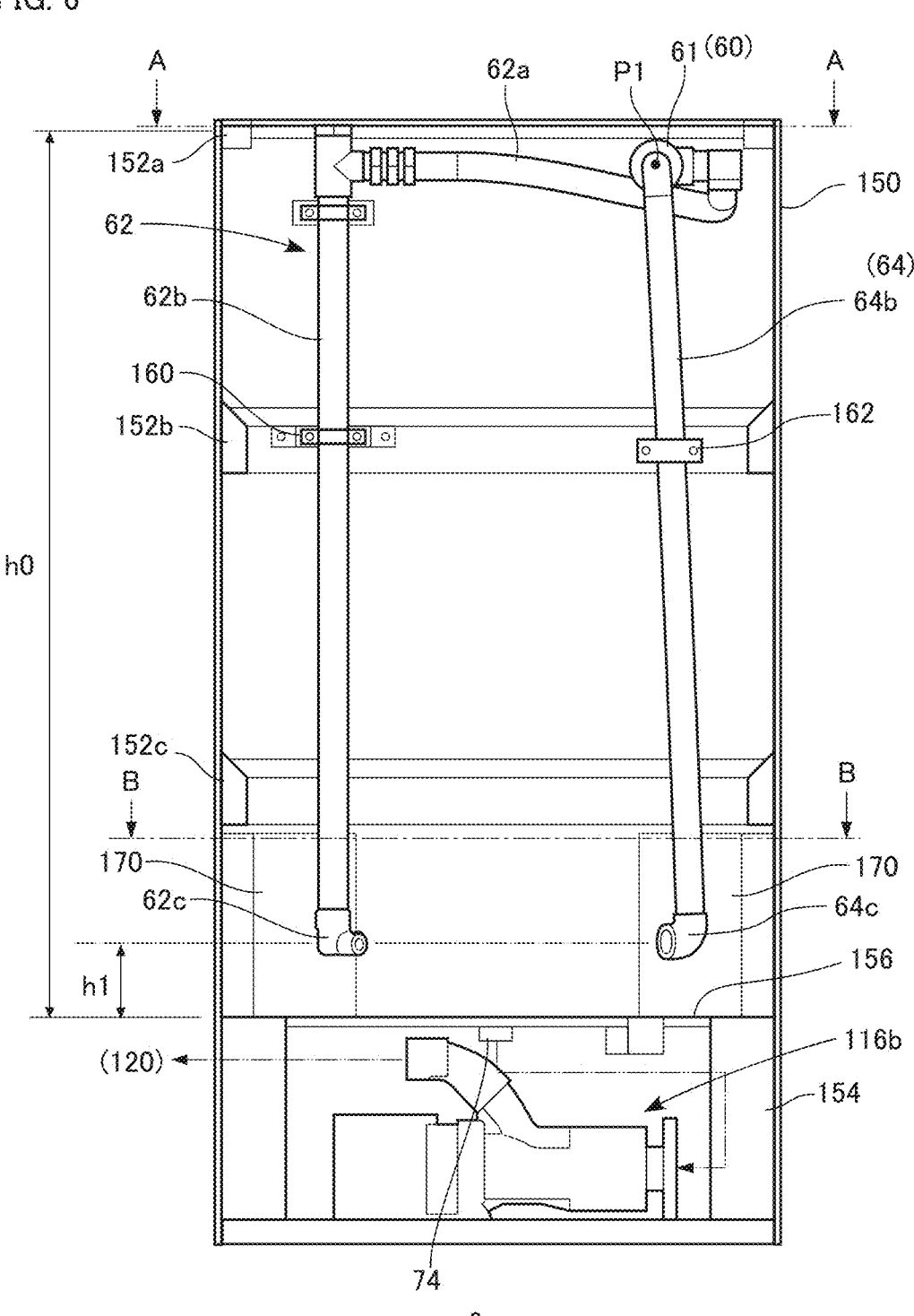
FIG. 6 is a diagram illustrating a structure of the secondary tank.
Figure 7:
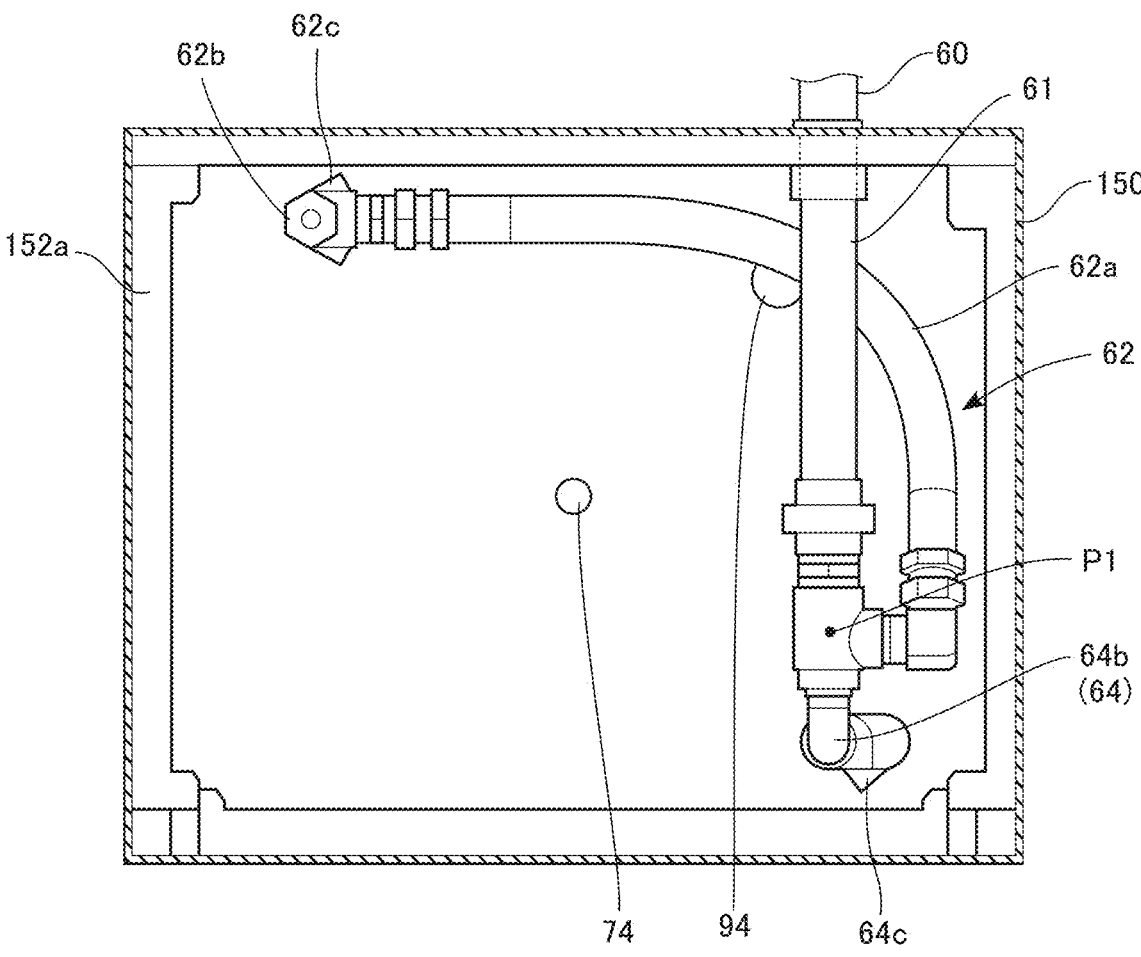
FIG. 7 is a diagram illustrating a structure of the secondary tank.

FIGS. 5 to 7 are diagrams illustrating a structure of the secondary tank 8. FIG. 5 is a perspective view from above, and FIG. 6 is a front view. FIG. 7 is a cross-sectional view taken along arrows A-A in FIG. 6. For convenience of explanation, FIG. 5 illustrates a state in which a top face and a front face of the secondary tank 8 are open. FIG. 6 illustrates a state in which the front face of the secondary tank 8 is open.

As illustrated in FIGS. 5 and 6, the secondary tank 8 includes a vertical tank body 150 for temporarily storing the coolant, and the first pipe 62 and the second pipe 64 arranged to hang from the top of the tank body 150. The tank body 150 has a rectangular parallelepiped shape that is rectangular in plan view and rectangular in side view, and reinforcing ribs 152a, 152b, and 152c are arranged on an upper portion, a middle portion, and a lower portion of inner walls of the tank body 150. A leg part 154 is provided to support the bottom face of the tank body 150 from below.

As also illustrated in FIG. 7, a distal end portion 61 of the pipe 60 described above extends horizontally through an upper portion of a side wall of the tank body 150. The distal end portion 61 extends near a right side face of the tank body 150 from a back face toward a front face thereof, and bifurcates at the distal end as the branching point P1 into the first pipe 62 and the second pipe 64. Part of the pipe 60 from the suction inlet 72 to the distal end portion 61 functions as "a shared pipe extending from the primary tank 6". The first pipe 62 has a curved pipe portion 62a that turns back from the branching point P1 and extends substantially horizontally along the right side face and the back face, and a straight pipe portion 62b that hangs from a distal end of the curved pipe portion 62a toward the bottom face of the tank body 150.

The description refers back to FIG. 6, in which a discharge pipe portion 62c is arranged at a lower end of the straight pipe portion 62b. The first pipe 62 is stably supported by being fixed to the rib 152b by a fixing bracket 160.

The second pipe 64 has a straight pipe portion 64b that hangs from the branching point P1, and a discharge pipe portion 64c arranged at a lower end of the straight pipe portion 64b. The second pipe 64 is stably supported by being fixed to the rib 152b by a fixing bracket 162. The straight pipe portion 62b of the first pipe 62 and the straight pipe portion 64b of the second pipe 64 are arranged at diagonal positions in the tank body 150 (see FIG. 7). The outlet 74 is formed at the middle of the bottom face of the tank body 150, and the outlet 94 is formed at the periphery of the bottom face.

The tank body 150 has a vertical tank structure with the height larger than the width and the depth. The discharge pipe portion 62c of the first pipe 62 and the discharge pipe portion 64c of the second pipe 64 each have a discharge outlet for the coolant supplied from the pipe 60. The orientations of the discharge outlets are adjusted so that a swirling flow of the coolant is generated in the tank body 150. The discharge pipe portions are at positions at predetermined height h1 from the bottom face 156 of the tank body 150, and the discharge outlets are at positions in a lower part of the tank body 150 and separated from the bottom face of the tank body 150. The swirling flow is formed in the lower part of the tank body 150.

While the discharge outlets are positioned at a height smaller than ¼ of the height h0 of the tank body 150 in the embodiment, the discharge outlets are preferably positioned at a height at least smaller than ½ of the height h0 of the tank body 150 in order to form the swirling flow in the lower part of the tank body 150.

While the first pipe 62 has the curved pipe portion 62a and the straight pipe portion 62b, the second pipe 64 only has the straight pipe portion 64b. The first pipe 62 and the second pipe 64 therefore have different lengths from each other from the branching point P1. The first pipe 62 is longer than the second pipe 64. Thus, the flow of the coolant discharged from the discharge outlet of the first pipe 62 and the flow of the coolant discharged from the discharge outlet of the second pipe 64 may become imbalanced owing to the difference in flow resistance therebetween, which may increase generation of stagnation in the tank body 150. In this regard, the bifurcated pipe structure of the first pipe 62 reduces generation of stagnation (details of which will be described later).

The pump 116b is arranged below the bottom of the tank body 150 (on the inner side of the leg part 154). Note that, because the structure, the function, and the like of the pump 116b are known as also taught in the aforementioned Patent Literature 2, the description thereof is omitted.

In the embodiment, the discharge pipe portion 62c of the first pipe 62 has a bifurcated structure, that is, two discharge outlets, so that the discharge directions of the coolant from the discharge outlets are different from each other. Thus, the discharge from one of the discharge outlets generates a swirling flow while the discharge from the other discharge outlet avoids or reduces generation of stagnation. Hereinafter, the structure of the first pipe 62 will be described first, and the functions achieved by the structure will be described subsequently.

Figure 9A:
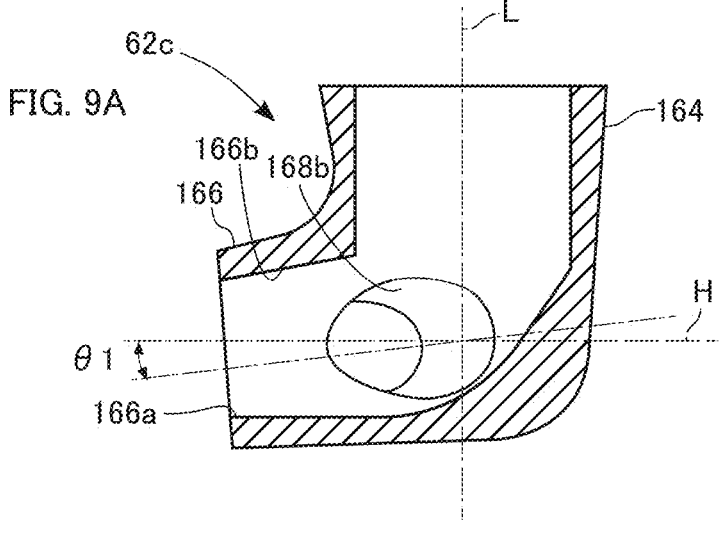
FIGS. 9A to 9C are diagrams illustrating the structures of the discharge pipe portions.
Figure 9B:
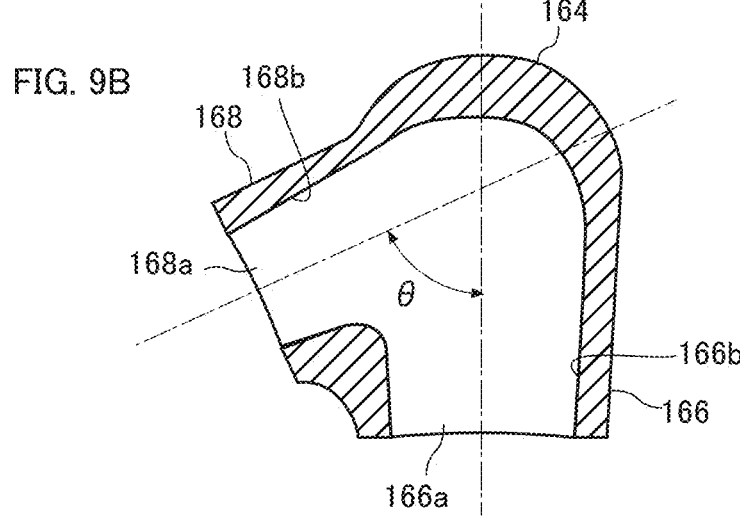
Figure 9C:
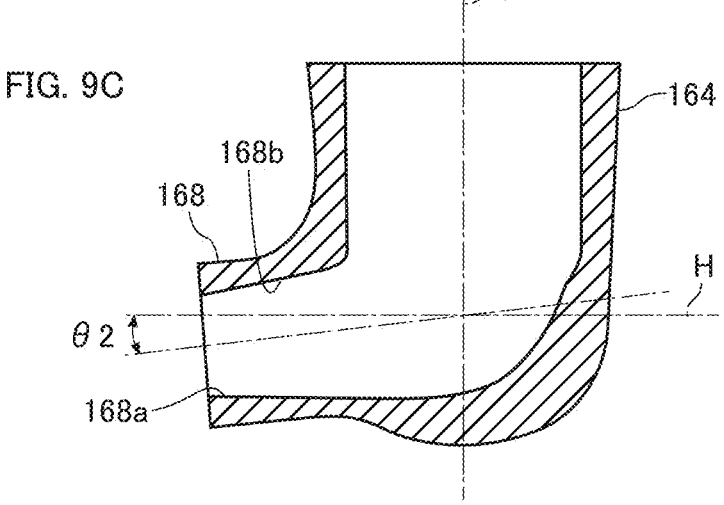

FIGS. 8A to 8C and FIGS. 9A to 9C are diagrams illustrating a configuration of the discharge pipe portion 62c. FIG. 8A is a perspective view, FIG. 8B is a front view, and FIG. 8C is a plan view. FIG. 9A is a cross-sectional view along arrows A-A in FIG. 8B, and FIG. 9B is a sectional view along arrows B-B in FIG. 8B. FIG. 9C is a cross-sectional view along arrows C-C in FIG. 8C.

As illustrated in FIGS. 8A to 8C, the discharge pipe portion 62c has a bottomed cylindrical shape including a pipe body 164 connected to the lower end of the first pipe 62 and bifurcating pipe portions 166 and 168 into which the pipe body 164 branches. The discharge pipe portion 62c can be formed by additive manufacturing using metal or resin, injection molding of a resinous material, or die casting of a metallic material, for example. An upper end opening of the pipe body 164 and a lower end opening of the straight pipe portion 62b are coaxially connected with each other. In the embodiment, the first pipe 62 is arranged in the tank body 150 so that the straight pipe portion 62b extends in the vertical direction (see FIG. 6). Thus, when the discharge pipe portion 62c is connected with the straight pipe portion 62b, the axis L of the pipe body 164 extends in the vertical direction.

The bifurcating pipe portions 166 and 168 protrude slightly downward relative to the horizontal direction from a lower portion of the pipe body 164. The bifurcating pipe portion 166 has a discharge outlet 166a, and the bifurcating pipe portion 168 has a discharge outlet 168a. The discharge outlet 166a functions as a "first discharge outlet", and the discharge outlet 168a functions as a "second discharge outlet". Thus, the discharge pipe portion 62c has one coolant inlet and two coolant discharge outlets, and the first discharge outlet and the second discharge outlet are integrally formed. The discharge outlets 166a and 168a are open downward at an angle with respect to a horizontal plane H.

As illustrated in FIGS. 9A to 9C, a passage 166b in the bifurcating pipe portion 166 and a passage 168b in the bifurcating pipe portion 168 communicate with each other in a lower part of the pipe body 164. The angle between the passage 166b and the passage 168b in plan view is an angle θ (FIG. 9B). While the angle θ is an acute angle (θ<90) in the embodiment, the angle θ is not limited thereto and can be appropriately set in view of promoting generation of a swirling flow and reducing stagnation.

The discharge outlet 166a is open downward at an angle θ1 with respect to the horizontal plane H (FIG. 9A). The discharge outlet 168a is open downward at an angle θ2 with respect to the horizontal plane H (FIG. 9C). While these angles are equal to each other (θ1=θ2) in the embodiment, these angles may be different from each other in a modification.

The discharge outlets 166a and 168a discharge the coolant flowing through the first pipe 62 into the tank body 150. The directions in which these discharge outlets are open, that is, the discharge directions of the coolant through the discharge outlets are each adjusted, so that the generation of a swirling flow in the tank body 150 can be kept in good conditions. In other words, optimizing the direction of the discharge outlet 166a promotes generation of a swirling flow. In addition, optimizing the direction of the discharge outlet 168a reduces generation of stagnation during generation of the swirling flow.

Unlike the discharge pipe portion 62c, the discharge pipe portion 64c is not bifurcated and therefore does not have a bifurcated structure (see FIG. 6). Specifically, the discharge pipe portion 64c has a structure corresponding to that of the discharge pipe portion 62c illustrated in FIG. 8A but without the bifurcating pipe portion 168 and with a discharge outlet larger than the discharge outlet 166a of the bifurcating pipe portion 166, detailed description of which is omitted.

Figure 10:
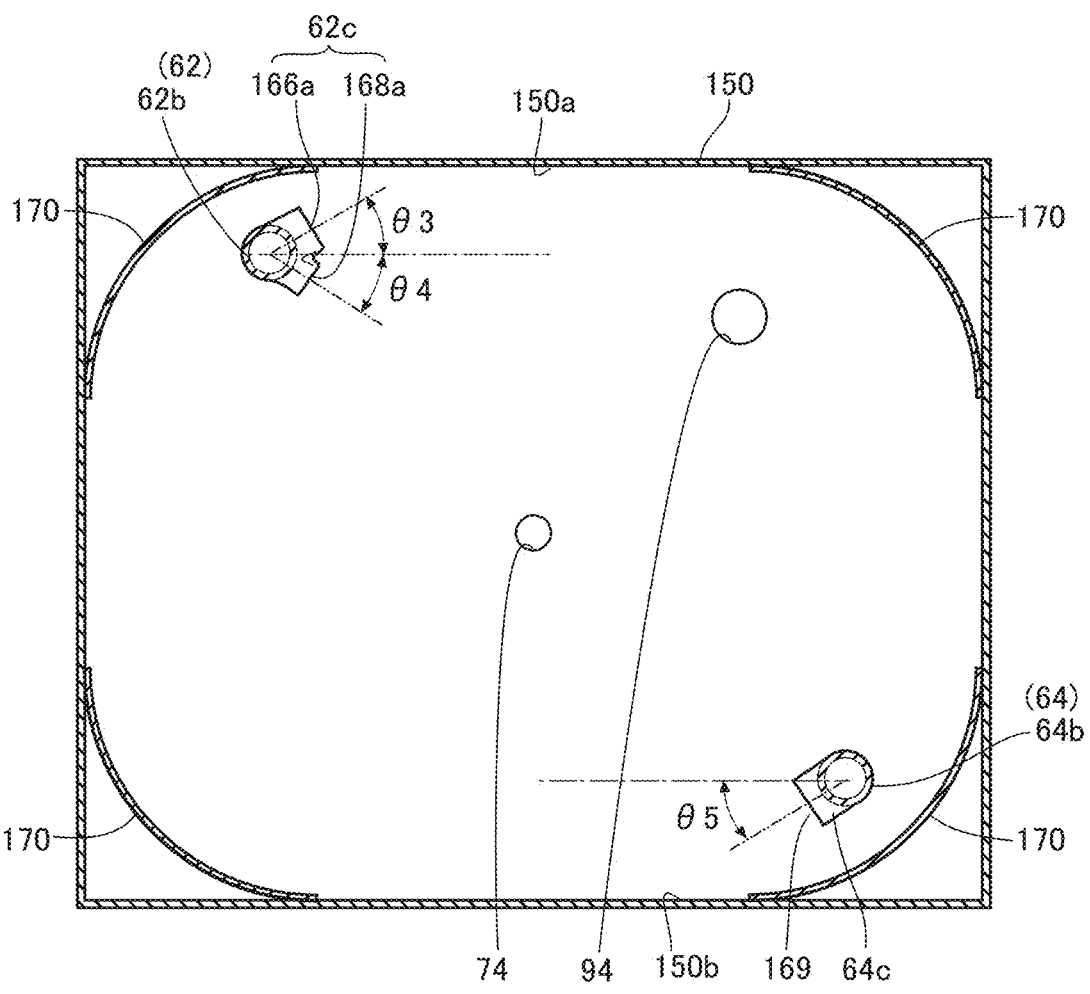
FIG. 10 is a cross-sectional view along arrows B-B in FIG. 6.

FIG. 10 is a cross-sectional view along arrows B-B in FIG. 6.

The tank body 150 is a square type tank having four flat inner faces, in which the discharge outlets 166a and 168a of the first pipe 62 are located near one of the inner faces. A discharge outlet 169 of the second pipe 64 is located near another of the inner faces. The discharge outlet 169 functions as a "third discharge outlet".

More specifically, four corners (square corners) of the lower part of the tank body 150 are each provided with a guiding portion 170 having a curved surface (see FIG. 6). The guiding portions 170 are arranged to be smoothly continuous with the four inner faces (flat faces) of the tank body 150 in plan view. The guiding portions 170 have a size (height) that includes the discharge outlets of the discharge pipe portion 62c and the discharge pipe portion 64c in the height direction. As a result, the tank body 150 has square corners with R-shaped inner surfaces (curved surface shapes) at the height positions of the discharge outlets. The guiding portions 170 guide the coolant flowing in the lower part of the tank body 150 into the inner circumferential direction to promote generation and maintenance of a swirling flow of the coolant. The outlet 74 is formed at the middle of the bottom face of the tank body 150 at which the center of swirling of the coolant is located.

The discharge pipe portion 62c is located on an inner side of a guiding portion 170 near one of the square corners in the tank body 150. More specifically, the discharge pipe portion 62c is located near the connection of the curved surface of the guiding portion 170 with the flat inner face of the tank body 150. The discharge pipe portion 64c is located at a position where the positions of the discharge pipe portion 64c and the discharge pipe portion 62c are substantially symmetric about the center of the tank body 150, that is, at a position diagonal to the discharge pipe portion 62c in the tank body 150. The discharge pipe portion 64c is also located on the inner side of the guiding portion 170.

Two-dot chain lines in FIG. 10 indicate the directions in which the discharge outlets are open, that is, the discharge directions of the coolant from the discharge outlets in plan view. One-dot chain lines in FIG. 10 indicate the direction parallel to the inner faces (flat inner faces 150a and 150b) of the tank body 150 located near the downstream of the discharge pipe portions 62c and 64c, respectively.

Specifically, the discharge outlet 166a of the first pipe 62 is open toward the inner face 150a of the tank body 150, and the discharge outlet 168a thereof is open toward a side opposite the inner face 150a. As illustrated, the discharge outlet 166a is open in a direction at an angle θ3 toward the inner face 150a with respect to the direction parallel to the inner face 150a, and the discharge outlet 168a is open in a direction at an angle θ4 toward the side opposite the inner face 150a with respect to the direction parallel to the inner face 150a. While these angles are equal to each other (θ3=θ4) in the embodiment, these angles may be different from each other and can be appropriately set in view of promoting generation of a swirling flow and reducing stagnation in the tank body 150.

The discharge outlet 169 of the second pipe 64 is open toward the inner face 150b of the tank body 150. As illustrated, the discharge outlet 169 is open in a direction at an angle θ5 toward the inner face 150b with respect to the direction parallel to the inner face 150b. While the angle θ3 of the discharge outlet 166a and the angle θ5 of the discharge outlet 169 are equal to each other (θ5=θ3) in the embodiment, these angles may be different from each other and can be appropriately set in view of promoting generation of a swirling flow in the tank body 150.

Figure 11A:
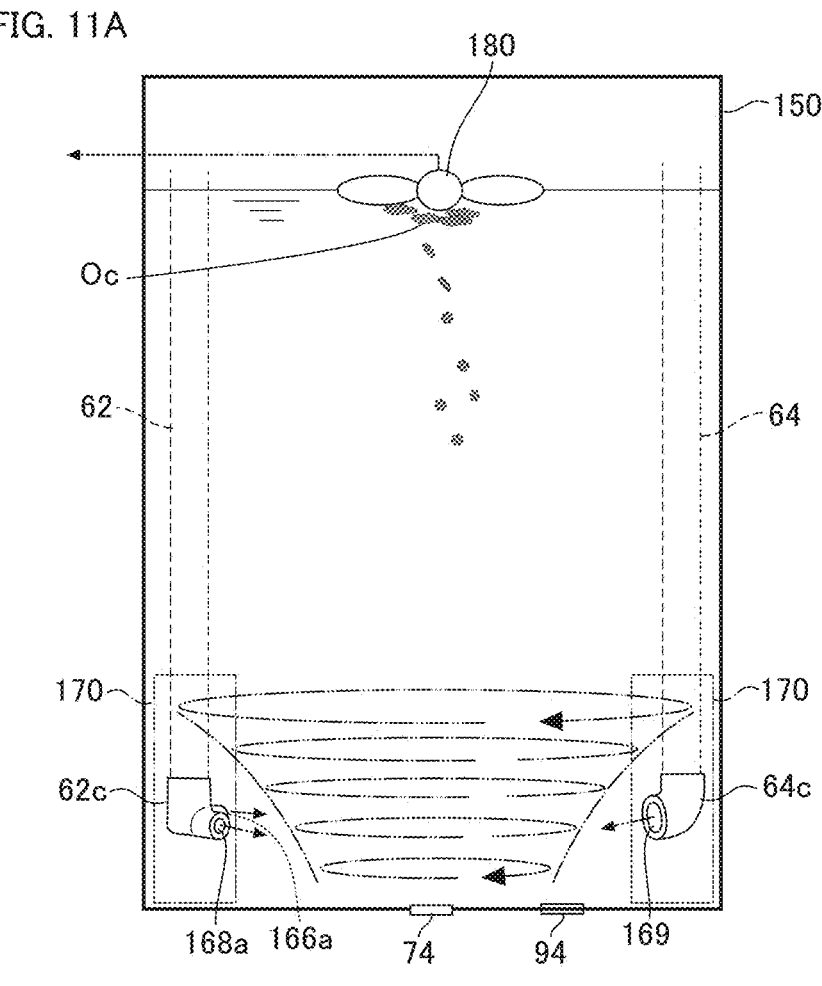
FIGS. 11A and 11B are diagrams schematically illustrating the principle of generation of a swirling flow in a tank body.
Figure 11B:
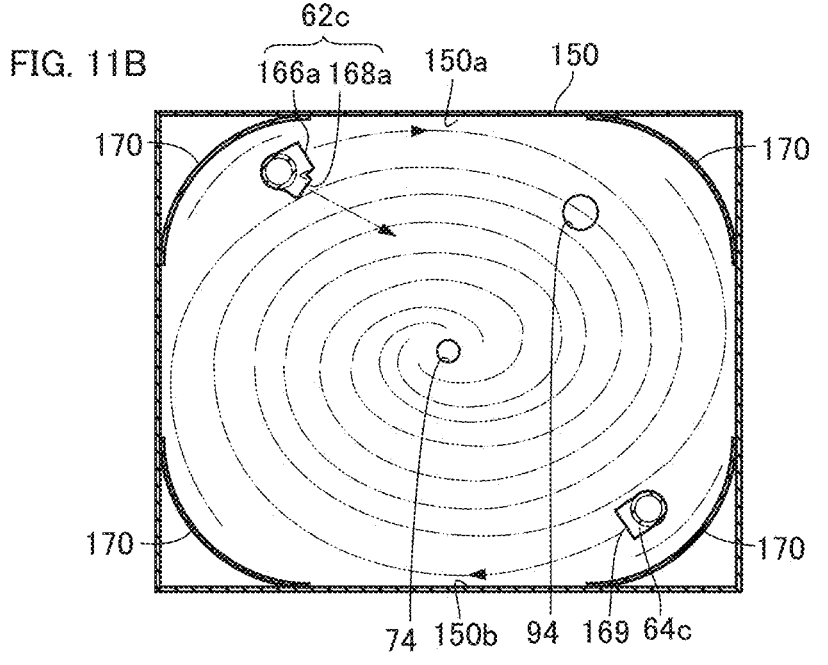

FIGS. 11A and 11B are diagrams schematically illustrating the principle of generation of a swirling flow in the tank body 150. FIG. 11A is a front view, and FIG. 11B is a plan view (corresponding to FIG. 10).

As described above, the discharge outlets 166a and 168a of the first pipe 62 and the discharge outlet 169 of the second pipe 64 are located in a lower region of the tank body 150, and the discharge outlets 166a and 169 are open toward the inner faces 150a and 150b, respectively, which are close to the respective discharge outlets 166a and 169. As a result, a swirling flow of the coolant can be generated in the lower part of the tank body 150. In other words, the discharge outlet 166a of the first pipe 62 and the discharge outlet 169 of the second pipe 64 constitute a "swirling flow generating structure" that causes the coolant to swirl along the inner faces of the tank body 150.

Verification conducted by the inventor, however, has shown that simply opening the discharge outlets 166a and 169 in this manner tends to result in a swirling flow biased toward the inner faces of the tank body 150 and stagnation generated on the inner side of the swirling flow. In this case, it is difficult to make sludge gather sufficiently toward the middle of the bottom face of the tank body 150. In this regard, in the embodiment, the first pipe 62 further has the discharge outlet 168a through which part of the coolant is discharged toward the inner side in the tank body 150. This disturbs the biasing of a swirling flow toward the inner faces and thus eliminates stagnation, so that a swirling flow can also be generated on the inner side (at the middle of the tank body 150). As a result, sludge can be efficiently discharged through the outlet 74 at the middle of the bottom face of the tank body 150.

In addition, the discharge outlets are located in the lower region of the tank body 150, so that the swirling flow can be concentrated in the lower part of the tank body 150. The discharge outlets are further directed slightly downward, which makes a swirling flow be easily generated below the discharge outlets, that is, over the bottom of the tank body 150. Specifically, in combination with the suction caused by the coolant discharged through the outlet 74, a swirling flow becomes an inverted cone shape (an inverted triangle in side view) or a cone shape (a shape with the swirl radius increasing from bottom to top) in the lower region of the tank body 150. In other words, the swirl radius becomes smaller and sludge more easily gathers toward the middle as the position in the tank body 150 is lower. Thus, sludge can be led to the outlet 74 at the middle of the bottom face, which improves the efficiency of removal of sludge through the outlet 74.

On the basis of the structure described above, the flow rate controller 101 drives the pump 116*a* (see FIG. 4) to control the discharge amount of the coolant so that a swirling flow of the coolant is formed in the lower part of the tank body 150 but is not formed at the top fluid surface. The coolant contains lubricant (machine oil) in addition to sludge. The lubricant Oc, which has a smaller specific gravity than the coolant, concentrates in the upper part of the tank body 150. Thus, in the embodiment, a floating oil skimmer 180 is provided in the tank body 150. The oil skimmer 180 has a suction portion that floats following the fluid level of the coolant, sucks the lubricant Oc separating from the coolant and floating toward the fluid level to collect the lubricant Oc into a waste oil box, which is not illustrated. The oil skimmer 180 includes a coalescer for coalescing and discharging oil.

A machine tool according to an embodiment has been described above.

In the embodiment, the vertical coolant tank (secondary tank 8) has the discharge outlets 166*a* and 169, which are open toward the inner faces of the tank to generate a swirling flow of the coolant, and the discharge outlet 168*a*, which is open toward the side opposite the inner faces of the tank to reduce generation of stagnation when a swirling flow is generated. Thus, the coolant is discharged through the discharge outlets 166*a* and 169 toward the inner faces to promote generation of a swirling flow, and the coolant is discharge through the outlet 168*a* toward a side opposite the inner face to eliminate stagnation. As a result, sludge contained in the coolant in the tank can be made to gather toward the middle of the bottom face of the tank, and be removed efficiently.

Forming the discharge outlet 166*a* and the discharge outlet 168*a* integrally can reduce the manufacture cost of the coolant discharge portion of the pipe. The discharge pipe portion 62*c* including the discharge outlet 166*a* and the discharge outlet 168*a* can be produced by injection molding of a resinous material or die casting of a metallic material. The discharge pipe portion 62*c* is connected with the lower end of the straight pipe portion 62*b*, and the first pipe 62 can thus be produced in a simple manner.

In addition, as illustrated in FIGS. 11A and 11B, the discharge outlets are located in the lower part of the tank taking the advantage of the secondary tank 8 being a vertical tank that is large in the height direction, so that a swirling flow is concentrated in the lower region of the tank body 150. Thus, because substantially no swirling flow is formed in the upper region of the tank body 150, oil contained in the coolant can be stably collected by the oil skimmer 180 floating on the fluid level. Specifically, sludge having a larger specific gravity than the coolant is actively removed through the outlet 74 at the bottom, and oil having a smaller specific gravity than the coolant is actively collected by the oil skimmer 180 located on the fluid level at the top. This facilitates keeping the coolant clean as a whole.

In the embodiment, the first pipe 62 and the second pipe 64 are arranged to hang from the top of the tank body 150, and the discharge outlets are formed at the lower ends of the first pipe 62 and the second pipe 64. Furthermore, the discharge outlets, through which the coolant is discharged, are directed slightly downward. This not only enables generation of a swirling flow in the lower region of the tank body 150, but also makes the pipes less likely to block the flow of the coolant in the lower region. As a result, formation of a swirling flow can be stabilized. Furthermore, because the pipes hang from the top, backward flow from tank body 150 into the pipes is prevented.

In addition, as illustrated in FIG. 4, the cyclone filter 120 (centrifugal filter), which is typically expensive, is provided on the coolant circulation path passing through the spindle unit 10, that is, the circulation path in which the coolant is required to be highly clean in the embodiment. In contrast, no centrifugal filter is provided on the coolant circulation path passing through each nozzle 28, that is, the circulation path in which the coolant is not required to be so clean as in the through-spindle coolant device. Because the provision of the centrifugal filter is limited, the manufacture cost of the coolant supply system is reduced.

In terms of supplying a clean coolant, it would be more natural to supply a coolant discharged from the periphery of the bottom face, where the concentration of sludge is low, in the secondary tank 8 to the spindle unit 10. In the embodiment, however, the coolant discharged from the middle of the bottom face, where the concentration of sludge is high, is purposely supplied to the spindle unit 10. These are seemingly contradictory, but because the coolant containing a high concentration of sludge passes through the cyclone filter 120, the resulting clean coolant can be supplied to the spindle unit 10. Furthermore, because the coolant containing much sludge is led to the cyclone filter 120, sludge in the secondary tank 8 can be efficiently collected and removed as a result.

In addition, for such use as cleaning the inside of the machine tool with the nozzles 28, for which high cleanness is not required, the coolant is discharged from the periphery in the vertical tank, where sludge is less likely to stagnate. Sufficient amount of coolant for not only machining with the machine tool but also flushing out chips or the like for automation can therefore be easily secured. Furthermore, because no centrifugal filter is provided on the coolant circulation path that does not pass through the spindle unit 10, the stagnation time necessary for sludge to be separated is reduced, which can increase the flow rate of coolant that can be supplied per unit time. Therefore, even when such conditions as an increase in the number of targets toward which the coolant is to be discharged or an increase in the discharge amount of the coolant due to demands for automation or the like arise, the conditions can be readily met.

[Modifications]

While the machine tool 1 is described as a combined machine in the embodiment, the machine tool 1 may be a turning center or a machining center.

In the embodiment, the machining chamber 2 is described as an example of the inside of the machine tool. In a modification, the coolant may be discharged into and circulated in the inside of the machine tool such as in the pallet replacement chamber or the like. In this case, a system and coolant tanks similar to those in the embodiment may be used for the coolant circulation path. The pallet replacement chamber is a space in which a pallet to which a workpiece is attached is replaced.

In the embodiment, as illustrated in FIG. 5, an example of a structure in which the first pipe 62 and second pipe 64 are arranged to hang from the top of the tank body 150 and the discharge outlets of the coolant are formed at the lower ends of the pipes has been presented. In a modification, the pipes may be arranged to protrude from the bottom of the tank body, and the discharge outlets may be formed at the tops of the pipes. Alternatively, the pipes may be arranged to protrude from a lateral side of the tank body, and the discharge outlets may be formed at the distal ends of the pipes. The directions in which the discharge pipes are open correspond to those in the embodiment.

In the embodiment, the first pipe 62 and the second pipe 64 are located at diagonal positions in the tank body 150. In addition, the first pipe 62 has a bifurcated structure including the discharge outlet 166*a* (first discharge outlet) and the discharge outlet 168*a* (second discharge outlet), but the second pipe 64 has a single discharge outlet 169. In a modification, each of both the first pipe 62 and the second pipe 64 may have a bifurcated structure including a first discharge outlet and a second discharge outlet. In this case, the first discharge outlet of the second pipe 64 may also be open toward an inner face of the tank body and the second discharge outlet thereof may also be open toward a side opposite the inner face. As a result, generation of stagnation caused by a swirling flow can further be reduced.

In the embodiment, an example of a structure in which the first pipe 62 has a bifurcated structure including the discharge outlet 166*a* (first discharge outlet) and the discharge outlet 168*a* (second discharge outlet) has been presented. In a modification, the first discharge outlet that is open toward an inner face of the tank body and the second discharge outlet that is open toward a side opposite the inner face may be located at different positions in the height direction of the first pipe 62.

In the embodiment, an example of a structure in which the discharge outlet 166*a* (first discharge outlet) and the discharge outlet 168*a* (second discharge outlet) are integrated with the first pipe 62 has been presented. In a modification, a structure in which a first discharge outlet that is open toward an inner face of the tank body and a second discharge outlet that is open toward a side opposite the inner face are formed on different pipes may be adopted. In a case where the discharge outlet 166*a* and the discharge outlet 168*a* are integrated with the first pipe 62, a structure other than the bifurcated structure formed by the manufacturing method present in the embodiment may be used. For example, a pipe may be bifurcated by means of a joint, and a discharge outlet forming member for adjusting the opening diameter or the like may be attached to the pipe joint.

In the embodiment, an example in which two discharge outlets of pipes are located at diagonal positions in the tank body 150 to promote generation of a swirling flow has been presented. In a modification, a discharge outlet or discharge outlets of a pipe or pipes may also be located at one or both of the remaining two corners in the tank body 150 to further promote generation of a swirling flow. In this case as well, a first discharge outlet open toward an inner face of the tank body and a second discharge outlet open toward a side opposite the inner face may be provided.

In the embodiment, an example of a structure in which the first pipe 62 has the discharge outlet 166*a* (first discharge outlet) open toward an inner face of the tank body 150 and the discharge outlet 168*a* (second discharge outlet) open toward a side opposite the inner face has been presented. In a modification, a configuration in which the second discharge outlet is open in a direction parallel to the inner face may be adopted. Alternatively, a structure in which the second discharge outlet is open toward the inner face of the tank body like the first discharge outlet but slightly further inward in the tank body than the first discharge outlet may be adopted.

In the embodiment, in terms of efficiently collecting sludge by using a swirling flow, an example of a structure in which the outlet 74 (first outlet) is formed at the middle of the bottom face of the tank body 150 and the outlet 94 (second outlet) is formed at the periphery of the bottom face has been presented. In such a case where the radius of a swirling flow at the bottom of the tank body 150 is small, the outlet 94 (second outlet) may be formed at a position inner than the periphery of the bottom face depending on the swirling radius of the coolant at the bottom. Specifically, a first outlet may be formed at a gathering position where sludge contained in the coolant is caused to gather by a swirling flow of the coolant, and a second outlet may be formed at a position away from the gathering position.

In the embodiment, an example of a structure in which the cyclone filter 120 (centrifugal filter) is provided in the pipe 76 (first passage) but no filter is provided in the pipe 96 (second passage) has been presented. In a modification, a filter that is lower in cost than the centrifugal filter, such as a porous filter or a filter having a mesh structure, may be provided.

While a square tank have a rectangular shape in plan view has been presented as an example of the tank body 150 in the embodiment, the tank body 150 may be a square tank having a polygonal shape in plan view. Alternatively, the tank body 150 may be a cylindrical tank having a circular shape in plan view. In this case as well, a first discharge outlet that is open toward an inner face of the tank body and a second discharge outlet that is open further inward in the tank body than toward the inner face (toward a side opposite the inner face) may be provided.

The present invention is not limited to the embodiments described above and modifications thereof, and any component thereof may be modified and embodied without departing from the scope of the invention. Components described in the embodiments and modifications may be combined as appropriate to form various embodiments. Some components may be omitted from the components presented in the embodiments and modifications.

CROSS-REFERENCE TO RELATED APPLICATIONS

This patent application claims priority to Japanese Patent Application No. 2023-215466 filed on Dec. 21, 2023, which is incorporated herein by reference in its entirety.

What is claimed is:

1. A coolant supply system that supplies a coolant to be discharged in an inside of a machine tool, the coolant supply system comprising:

a coolant tank that stores the coolant discharged from the inside;

a first passage connecting a first outlet of the coolant tank with a first discharge part provided in the inside, the first passage leading the coolant discharged through the first outlet to the first discharge part; and a second passage connecting a second outlet of the coolant tank with a second discharge part provided in the inside, the second passage leading the coolant discharged through the second outlet to the second discharge part, wherein the coolant tank includes:

a vertical tank body; and a swirling flow generating structure that causes the coolant discharged from the inside to swirl along an inner face of the tank body, wherein, in the tank body, the first outlet is located at a gathering position toward which sludge contained in the coolant is caused to gather by a swirling flow of the coolant, and the second outlet is located at a position away from the gathering position, wherein the first discharge part is a spindle unit that holds a tool having an internal passage through which the coolant is to be discharged, and has a communication passage through which the inner passage and the first passage communicate with each other, wherein the second discharge part is a discharging device having a discharge outlet larger than a discharge outlet of the tool, and wherein a centrifugal filter having a function of separating the sludge by a centrifugal force is provided on the first passage, and no centrifugal filter is provided on the second passage.

2. The coolant supply system according to claim 1, wherein the second discharge part is a nozzle for cleaning the inside.

3. The coolant supply system according to claim 1, wherein the centrifugal filter is a cyclone filter.

4. The coolant supply system according to claim 1, wherein the first outlet is located at a middle of a bottom face of the tank body, and the second outlet is located at a periphery of the tank body.

5. The coolant supply system according to claim 1, wherein the swirling flow generating structure is located in a lower region of the tank body, and has a discharge outlet through which the coolant discharged from the inside is discharged to swirl along the inner face of the tank body.

6. The coolant supply system according to claim 5, further comprising:

a primary tank that stores the coolant discharged from the inside;

a secondary tank being the coolant tank located downstream of the primary tank;

a pipe having the discharge outlet and connecting the primary tank with the secondary tank; and a pump provided on the pipe, for pumping up the coolant from the primary tank to supply the coolant into the tank body of the secondary tank, wherein a discharge amount of the coolant from the discharge outlet is adjusted so that a swirling flow of the coolant is formed in a lower region of the tank body.

* * * * *